(No Model.) 2 Sheets—Sheet 1.
E. E. ELLIS.
MEANS FOR PREVENTING PUNCTURE OF PNEUMATIC TIRES.
No. 567,565. Patented Sept. 8, 1896.
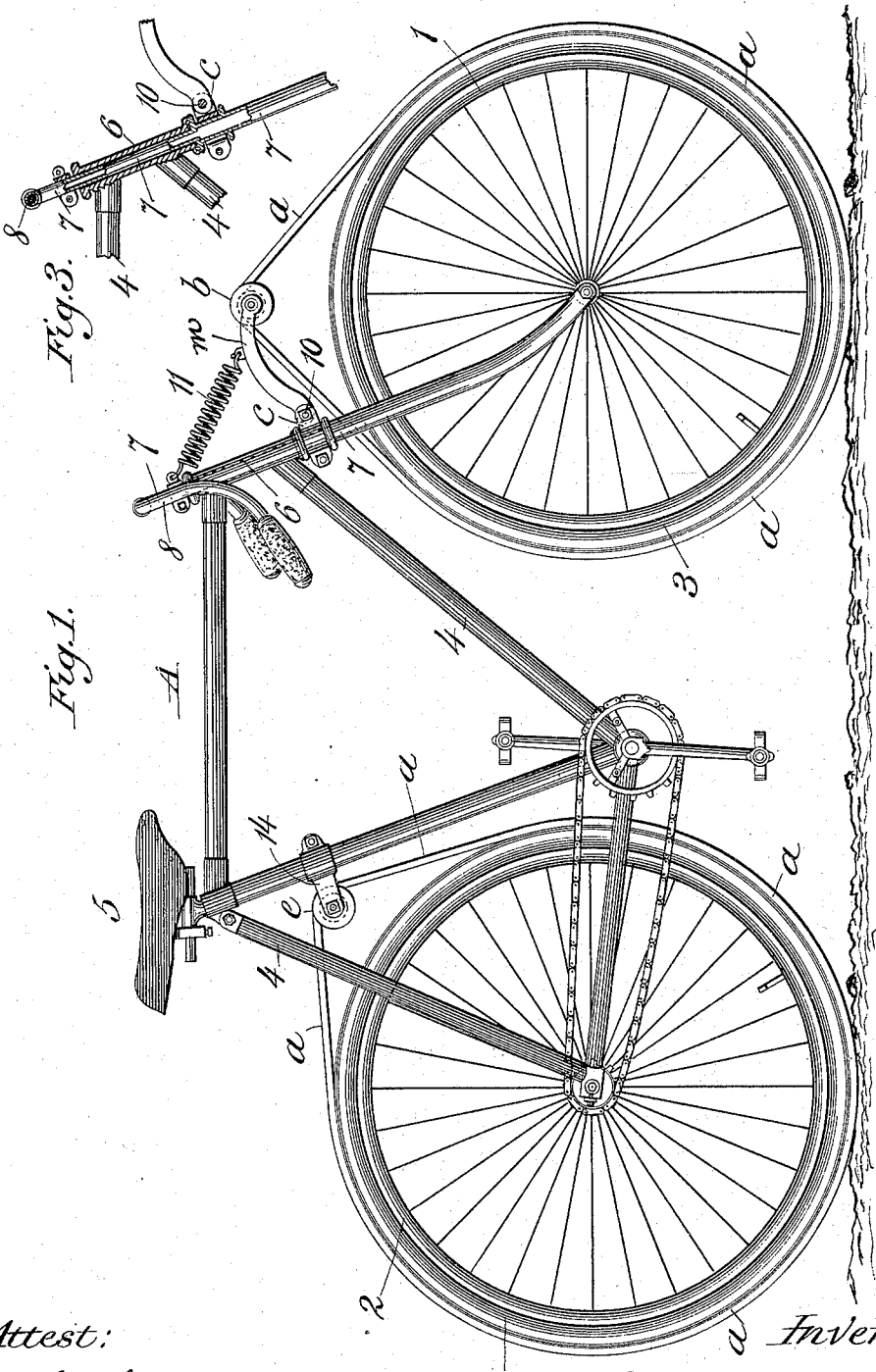

(No Model.) 2 Sheets—Sheet 2.
E. E. ELLIS.
MEANS FOR PREVENTING PUNCTURE OF PNEUMATIC TIRES.
No. 567,565. Patented Sept. 8, 1896.
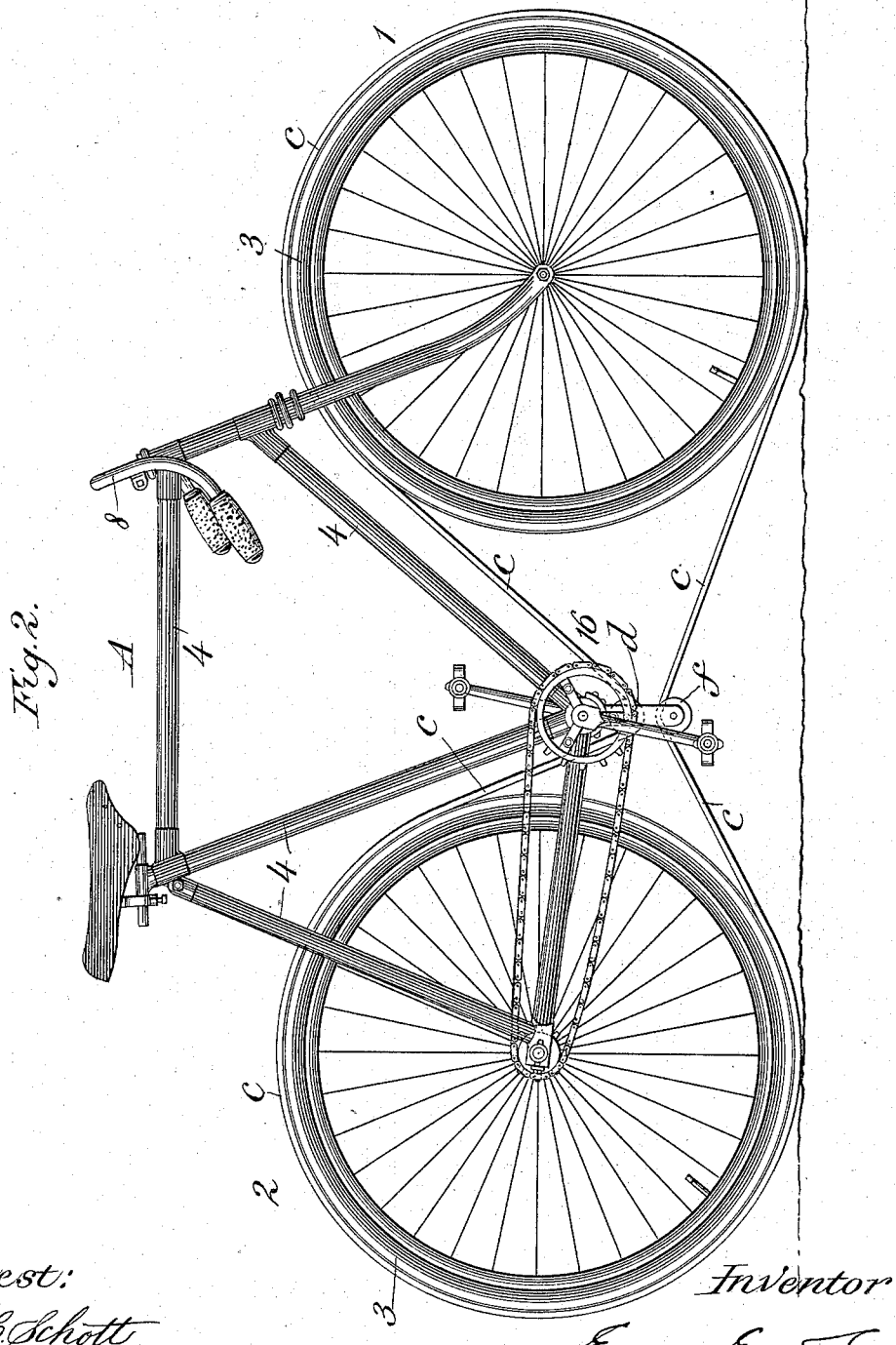
Attest:
F. H. Schott
Inventor
Edward Everett Ellis

UNITED STATES PATENT OFFICE.

EDWARD EVERETT ELLIS, OF WASHINGTON, DISTRICT OF COLUMBIA, ASSIGNOR OF ONE-HALF TO JOHN C. PENNIE, OF SAME PLACE.

MEANS FOR PREVENTING PUNCTURE OF PNEUMATIC TIRES.

SPECIFICATION forming part of Letters Patent No. 567,565, dated September 8, 1896.

Application filed December 23, 1895. Serial No. 573,070. (No model.)

*To all whom it may concern:*

Be it known that I, EDWARD EVERETT ELLIS, a citizen of the United States, residing at Washington, in the county of Washington, in the District of Columbia, have invented certain new and useful Improvements in Means for Preventing Puncture of Pneumatic Tires; and I do hereby declare the following to be a full, clear, and exact description of the invention, such as will enable others skilled in the art to which it appertains to make and use the same.

This invention relates to bicycles and similar vehicles; and it consists substantially in such features of improvement as will hereinafter be more particularly described.

The invention has for its object the prevention of puncture of the ordinary rubber or pneumatic tire as employed on bicycles and similar vehicles, and the invention also has certain other objects in view, as will more fully hereinafter appear when taken in connection with the accompanying drawings, in which—

Figure 1 is a side view of an ordinary bicycle having in connection therewith one form or embodiment of my invention. Fig. 2 is a similar view representing another form or embodiment, and Fig. 3 is a part sectional view in detail.

Before proceeding with a more detailed description I desire to state that my invention comprises broadly and without limitation, the combination, with a pneumatic tire, of an independent movable protecting-band, upon which the tread of the tires rests continuously while the machine is in motion, so that the tires are prevented from direct contact with the ground or other surface, and consequently are protected or guarded against puncture, the said movable protecting-band being of a greater length than the tire and passing around a guide on the machine.

My invention furthermore comprehends, broadly and without limitation, an independent movable protecting-band which is actuated or operated directly through the medium of the wheel or wheels of the machine, and irrespective of whether a separate independent movable protecting-band be employed for each of said wheels or whether a single independent movable protecting-band be employed for both wheels, the said movable protecting-band in either case being of greater length than the pneumatic tires and passing over a guide or guides on the machine.

It will thus be seen that my invention is capable of being embodied in a great many different ways, but in practice I preferably resort to either one of the several embodiments, such, for instance, as I have illustrated in the accompanying drawings.

In the drawings, A represents an ordinary bicycle having the front wheel 1 and rear wheel 2, each of which is provided with a rubber or pneumatic tire 3.

The frame of the machine is designated as 4, the seat at 5, and the steering-head at 6, while the usual rotating stem is seen at 7, having the ordinary form of handle-bar 8.

In carrying my invention into effect I provide each of the wheels of the machine with an independent movable protecting-band for preventing the tires from being punctured or penetrated by any sharp edge or point, and this independent movable protecting-band comprises simply a band or belt *a* of leather, flexible steel, or other suitable material, which incloses the tire in such manner that portions thereof are continuously brought around beneath the tire at the ground, so that the tire is never in direct contact with the ground. The said independent movable protecting-band should of course travel or move in the same direction as the wheel, by which to lessen as much as possible all frictional resistance, and while such movement could easily be derived from any moving part of the machine, I prefer that the same be effected through the medium of the wheel itself. Thus, as shown in Fig. 1, the protecting-band *a* passes around the wheel, as shown, and the same is of length sufficient to extend up and over a guide-pulley *b*, supported or held in position at *c* upon the stem 7. In this way, as the machine is propelled, the friction produced on the protecting-band causes the latter to move or travel with the wheel, and the tire is thus always protected from injury.

It perhaps may be desirable in some instances that no more of my improved independent movable protecting-band be permitted to be in contact with the tire than equals the actual amount of ground surface covered by the tire at any one time, and this I could easily accomplish by arranging a number of guide-pulleys similar to b at different parts of the machine. Inasmuch, however, as such a construction would necessitate a number of turning-points around which the movable protecting-band would have to pass, the effect derived from the arrangement shown is substantially equal, all things being considered. The pulley b might in some instances be supported from the steering-head of the machine, but in order that the movable protecting-band a shall always be brought as nearly as possible into correspondence with the position of the front wheel in turning, the said pulley is preferably supported from the stem 7. In that form of machine where there is space enough the said pulley could be suspended directly within the fork above the wheel. To relieve as much as possible all jerky effects upon the protecting-band due to the movements of the limbs of the rider, I pivotally suspend said pulley at 10, in a bracket m, and provide a spring 11 of strength sufficient to prevent the pulley being drawn too far downward in the direction of the wheel, yet at the same time allowing an easy resilient action. This spring, while not essential in use, is preferably employed, and if the same is dispensed with the bracket is made rigid instead of being pivoted at 10. As also shown in the drawings, the rear wheel is in like manner provided with a similar independent movable protecting-band a, and the pulley e therefor is in this instance supported or held in a bracket 14 fastened to the frame of the machine. This bracket may also be provided with a spring in the same manner and for a similar purpose as the spring 11, or both the brackets 14 and m could be of an elastic or resilient nature when both are rigidly supported. For the present purposes, however, I have simply represented an ordinary rigid bracket for pulley e, the looseness of the pulley fully answering all purposes.

As a still further embodiment of my invention reference is made to Fig. 2, wherein, instead of employing a separate movable independent protecting-band for each wheel, I resort to the use of a single movable protecting-band c for both wheels. In this construction the said single independent movable protecting-band is made to pass around both wheels, thence under an upper pulley d, supported at the lower part of the frame adjacent to the driving mechanism 16, and over a lower pulley f, arranged beneath the pulley d, with space sufficient for the free passage and working of the said protecting-band. The purpose of the said lower pulley f is to enable that much of the movable protecting-band as extends between the wheels at the ground surface to be elevated from the ground, and thereby reduce friction. Additional guide-pulleys could be employed in connection with this last embodiment if found desirable; and in some instances, furthermore, the independent movable protecting-band may be slightly concave to better fit the tire.

It is not considered necessary to further emphasize the generic character or nature of my invention, and it will be understood that none of the effects produced by a pneumatic tire whatever are lost in the use of my device.

I claim—

1. The combination with the pneumatic tire of a bicycle or other similar vehicle, of an independent movable protecting-band of greater length than the tire, and a guide for said band supported by the machine, substantially as described.

2. The combination with the pneumatic tire of a bicycle or other similar vehicle, of an independent movable protecting-band of greater length than the tire and operated to be moved by the tire, and a guide for said band supported by the machine, substantially as described.

3. A protector for the pneumatic tire of a bicycle or other similar vehicle, the same comprising an endless protecting-band of a length more than sufficient to embrace the tire, and a guide-pulley for the band provided with means for attachment to a vehicle, substantially as described.

4. A bicycle or similar vehicle comprising the combination with the pneumatic tires thereof of an independent movable protecting-band for the tread of the tires of the wheels, the same consisting of an endless band passing around or partly encompassing both tires, and separate guide-pulleys around which the upper and lower parts of the band pass; substantially as shown and for the purpose described.

In testimony whereof I affix my signature in presence of two witnesses.

EDWARD EVERETT ELLIS.

Witnesses:
T. H. LIBBEY,
JOHN C. PENNIE.